United States Patent

Beltz

[15] 3,643,019

[45] Feb. 15, 1972

[54] VARIABLE LENGTH CODING METHOD AND APPARATUS

[72] Inventor: John Prickett Beltz, Willingboro, N.J.

[73] Assignee: RCA Corporation

[22] Filed: Apr. 22, 1970

[21] Appl. No.: 30,812

[52] U.S. Cl. ............................178/6.8, 178/7.7, 178/DIG. 3

[51] Int. Cl. ............................H04n 7/12

[58] Field of Search ...................178/DIG. 3, DIG. 34, 7.7, 6, 178/6.8

[56] References Cited

UNITED STATES PATENTS

| | | | |
|---|---|---|---|
| 3,347,981 | 10/1967 | Kagan et al. | 178/DIG. 3 |
| 3,414,677 | 12/1968 | Quinlan | 178/DIG. 3 |
| 3,478,163 | 11/1969 | Chatelon | 178/DIG. 3 |

*Primary Examiner*—Robert L. Richardson
*Attorney*—H. Christoffersen

[57] ABSTRACT

There is disclosed a method and apparatus for providing a coded representation of a black and white graphical pattern, such as an alphanumeric character or other symbol, a line drawing, etc., which reduces the storage space needed to store a representation of the pattern. Each pattern is divided into a plurality of adjacent linear zones that include one or more zonal segments of alternating black and white colors. A zonal segment is represented by a combination of groups of binary numbers, with each group containing a predetermined number of individual binary bits. The number of groups in the combination varies depending on the length of the segment. Successive combinations are distinguished from each other by reserving a first position in each group as a delimiter bit position to denote the beginning of each combination. A second predetermined position in the first combination of a zone is designated as a color bit position and specifies the visual reflectance of the first zonal segment of the zone. Succeeding zonal segments in a zone alternate in color. The color bit position in the combination defining the last segment of a zone is redesignated as an end-of-zone bit position to denote the end of a zone. Thus the combinations defining a zone vary depending on the length of the zone, and the number of groups in a combination varies depending on the length of the corresponding zonal segment.

14 Claims, 5 Drawing Figures

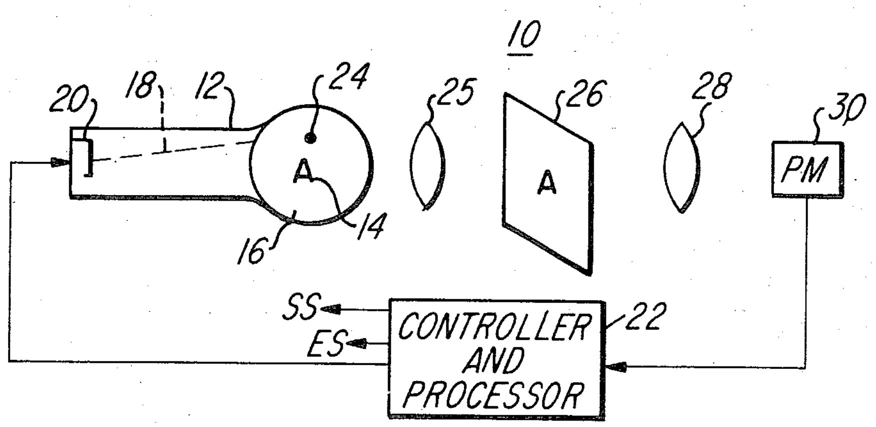
FIG. 1.
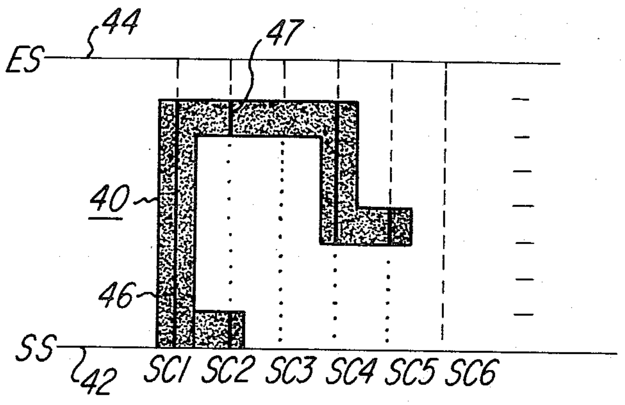
FIG. 2.
| ZONES | ZONAL SEGMENTS | | | |
|---|---|---|---|---|
| | COL. 4 WHITE | COL. 3-BLACK | COL. 2-WHITE | COL. 1-BLACK |
| SC1 | | | 0011 | 0110 1000 0000 0011 |
| SC2 | 0011 | 1000 0000 0001 | 0100 1000 0000 0001 | 1000 0000 0011 |
| SC3 | 0011 | 1000 0000 0001 | 0110 0000 0000 0001 | |
| SC4 | 0011 | 0100 0000 0000 0001 | 0010 1000 0000 0001 | |
| SC5 | 0011 | 1000 0000 0001 | 0010 1000 0000 0001 | |
| SC6 | | 0011 | 0001 | |
FIG. 3.
INVENTOR.
John P. Beltz
BY
John T. O'Halloran
ATTORNEY INVENTOR.
John P. Beltz
BY John T. O'Halloran
ATTORNEY

INVENTOR.

BY John P. Beltz

John T. O'Halloran

ATTORNEY

VARIABLE LENGTH CODING METHOD AND APPARATUS

BACKGROUND OF THE INVENTION

Recently, electronic photocomposition systems have become commercially available. One such system utilizes an imaging device, such as a cathode ray tube, to create pattern, such as characters, line drawings, etc. on a recording surface, such as photographic film. The imaging device creates the patterns by providing a plurality of adjacent scanlines that form slices or zones of a pattern. The cathode ray tube imaging device is blanked and unblanked at predetermined points during each scanline to create the outline trace of the pattern and a portion of the background of the pattern. The scanning may, for example, be vertical so that when characters are created, the characters are formed one-at-a-time in a row, as the scanning beam progresses from left to right. To provide characters of high graphic quality, more than a hundred scanlines may be utilized to form each character. For simple line drawings, up to thousands of scanlines may be needed to recreate the pattern.

The blanking and unblanking of the scanning beam is done under the control of coded binary signals, which, for characters, comprise an electronic font. An electronic font creates characters that are indistinguishable from characters formed from mechanical or photomechanical versions of the font. To store such electronic font data, it is necessary to incorporate a memory into each electronic photocomposition system. Inasmuch as some fonts are more highly stylized than others, and all fonts include characters of large point sizes, a relatively large memory is needed to create characters in some instances. To avoid running out of storage space, it is important that the binary data in the electronic font be as compact as possible.

One data compaction scheme that has heretofore been used is a run length coding scheme. A run length code effectively represents a length as an equivalent binary number. Run length codes include binary words with predetermined numbers of binary bits in the words. Thus a short length requires substantially the same number of binary bits to recreate the length as a long length. Such coding schemes are wasteful of storage space. This is particularly important in photocomposition systems where it is desirable to store not only a plurality of electronic fonts, but other patterns as well, so that complete publications can be photocomposed with text, drawings, photographs, etc.

SUMMARY OF THE INVENTION

In a system embodying the invention, a pattern is represented by coded binary signals. The pattern is divisible into a plurality of adjacent zones of one or more zonal segments, with successive ones of the segments in each zone exhibiting different visual reflectance states. The system includes means for providing a plurality of combinations of groups of binary signals for defining the pattern, with each combination corresponding to a single zonal segment. Each group in the combinations includes a predetermined number of individual binary signals with the number of groups in each combination depending upon the length of its corresponding zonal segment. The system also includes means for providing a delimiter binary signal at a first predetermined position in the first group of a combination to separate one combination from the next successive combination. The system further includes means for providing a color designator binary signal at a second predetermined position in the first combination of a zone to denote the visual reflectance of the first zonal segment of a zone, with further means for redesignating the color designator position signal in the last combination of a zone as an end determining signal to define the end of a zone.

BRIEF DESCRIPTION OF THE DRAWING

FIG. 1 is an overall block diagram of an electronic photocomposition system embodying the invention;

FIG. 2 is a representation of the scanning of a graphical pattern;

FIG. 3 is a table denoting the variable length codes that are utilized to represent the zonal segments in selected scans of the pattern of FIG. 2; and FIG. 4, including

GENERAL DESCRIPTION

Figure 4A:
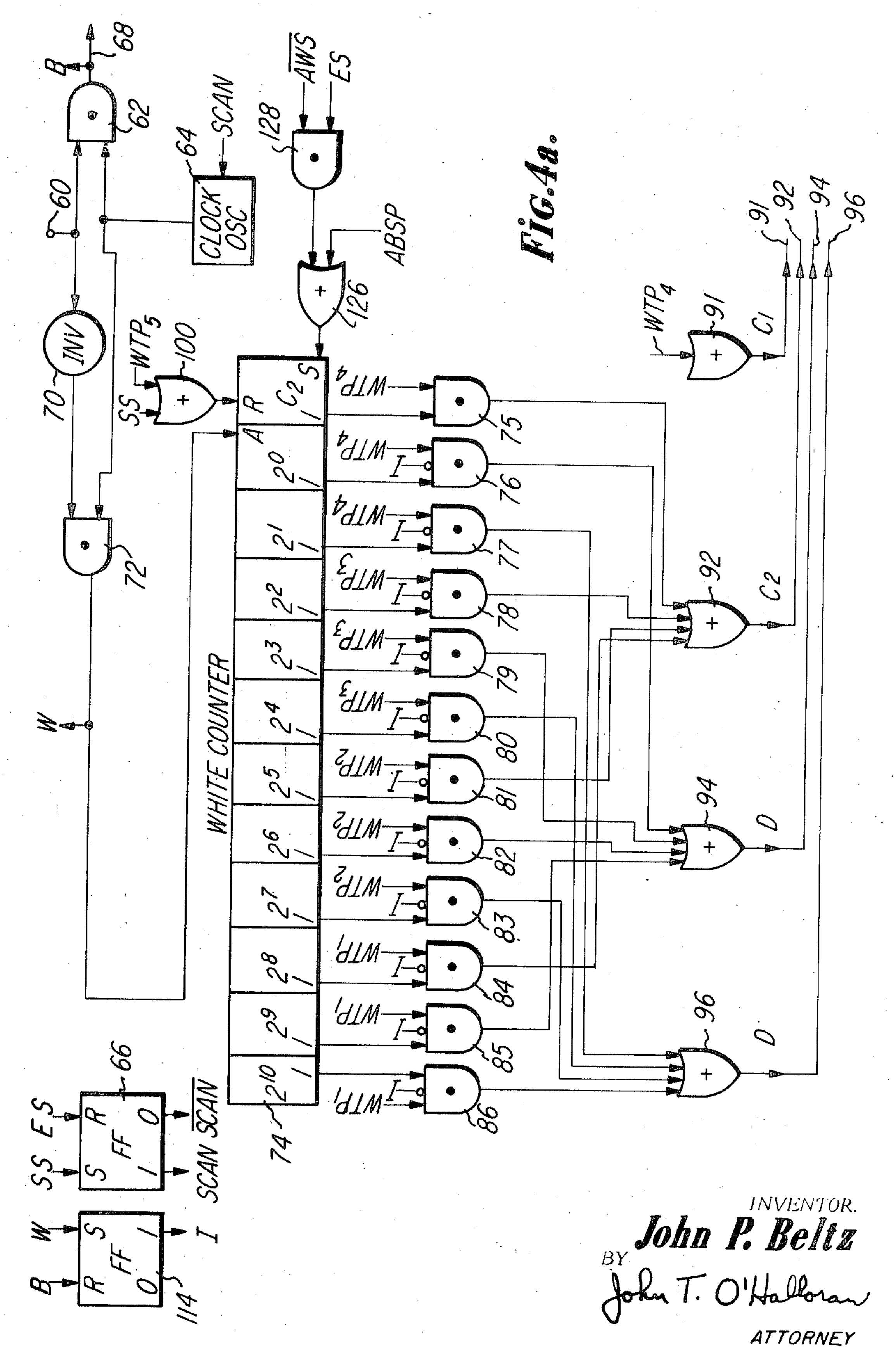
FIGS. 4*a* and 4*b*, is a logic block diagram of a portion of the system of FIG. 1.

Referring now to FIG. 1 there is shown an electronic photocomposition system 10 in which the invention may be utilized. The photocomposition system 10 may, for example, comprise an RCA VIDEOCOMP Series 70/800 or a similar system. The photocomposing system 10 includes an imaging device 12, such as a cathode-ray tube, that creates lexical patterns, such as alphanumeric characters 14 or other symbols, on the face 16 thereof. Additionally, the imaging device 12 also creates graphical patterns such as line drawings, halftone reproductions, etc. The cathode-ray tube 12 includes an electron scanning beam 18 that emanates from a cathode 20 in the electron gun section (not shown) of the tube 12. The scanning beam 18 is deflected under the control of an electronic controller and processor 22. The scanning beam 18 creates a scanning spot 24 in the phosphor on the face 16 of the tube 12. Patterns in the form of light images are produced by the scanning spot 24 and the light image patterns are focused by a lens 25 onto a photosensitive recording surface, such as high gamma photographic film 26.

The cathode-ray tube 12 may also be operated as a flying spot scanner. In such operation, a pattern, such as the alphanumeric character 14, which has been previously recorded on a photographic film, such as a transparency 26, is scanned by the flying spot 24. The scanning spot may be deflected, for example, in a vertical raster scanning mode progressing from left to right. The light penetrating through the transparency 26 is focused by a lens 28 onto a photosensitive pickup device, such as a photomultiplier tube 30. The image signals derived from scanning the transparency 26 are processed in the processor 22 to achieve compaction of the data scanned.

In FIG. 2 there is shown a pattern 40, that may represent either a symbol, such as a character, or a line drawing. The pattern 40 is initially scanned into the system 10 by the imaging device 12, which first operates as a flying spot scanner, and then the pattern 40 is recreated on a film 26 by the imaging device 12, which then operates as a display device. Thus the device 12 exhibits a dual role or function.

The pattern 40 is scanned by a plurality of vertical scans, referenced SC1 through SC6, in a vertical raster scanning pattern as shown in FIG. 2. Of course, in actuality hundreds of scans might be needed to extract and represent the desired information from a pattern but, for convenience of explanation, only six scans are shown in FIG. 2. Each of the scans begins at a start scan (SS) line 42 below or at the bottom of the pattern 40 and terminates at an end scan (ES) line 44 above the pattern 40. At the end of a vertical scan, the scanning beam is rapidly retraced back to the start scan line 42. Start and end scan pulses defining the bounds of a vertical scan are generated in the processor 22. It is to be noted that the background surrounding the pattern 40 is scanned, as well as the outline trace of the pattern 40 itself. The outline trace of the pattern 40 is defined as the black portion of the pattern which does not include the background. It is apparent that any pattern needs a background to be uniquely distinguishable, but the background outside the outline trace of the pattern 40 can be supplied by the recording surface on which the pattern is recreated. Thus even though the background outside the outline trace of the pattern 40 is scanned in the system 10, only the pertinent data representing the outline trace of the pattern 40 and the background below and within the outline trace is stored and utilized in the system 10. This achieves a compaction of the data needed to represent uniquely the pattern 40.

Each scanline comprises a slice or zone of the pattern 40 and thus the scanlines SC1 through SC6 effectively divide the pattern into a plurality of substantially linear adjacent zones. Each zone within the outline trace of the pattern 40 includes one or more zonal segments. Successive segments in a zone exhibit different visual reflectance states, e.g., black or white, depending upon whether the outline trace of a pattern or the background of the pattern 40 is being scanned. The black zonal segments are shown solid in FIG. 2 whereas the white zonal segments are shown dotted. The background that is scanned outside of the outline trace of the pattern 40 is shown dashed in this figure. Of course, the colors of the outline trace and background of the pattern 40 may be other than black and white if desired.

The zones, and therefore effectively the entire pattern 40, are represented, in equipment embodying the invention, by combinations of binary numbers, with each individual combination representing, inter alia, the length of a corresponding zonal segment. Each combination includes a variable number of groups of binary numbers, with the numbers of groups being dependent upon the length of its corresponding zonal segment. Thus the combination defining the black zonal segment 46 in FIG. 2 includes more groups than the combination representing black segment 47 because it is longer. Each group includes the same predetermined number of binary bits. Consequently each combination includes only the number of groups needed to define the length of its corresponding zonal segment, which achieves a compaction of data.

In order to be able to distinguish one segmental combination from the next successive combination, the least significant bit position in a combination is selected as a framing or delimiting position. When a binary digit of one value, e.g., a "1," is recorded in this position, it identifies the least significant group in the combination. This bit position in other groups in the same combination has a binary "0" stored therein. Thus only the least significant group in a combination has a binary "1" stored in the least significant bit position thereof. Therefore the beginning of each combination in a stream of coded groups is readily detectable.

The second least significant bit position in the least significant group of the first segmental combination of a zone is selected as a color bit position. When a binary digit of one value, e.g., a binary "1" is stored in this position, the color of the first segment in a zone is designated as black. When a binary "0" is stored in this color designator position, it indicates that the color of the first segment in a zone is white. The successive segments alternate in color. This bit position in these segmental combinations has a binary "0" stored therein. However, in the last combination of the zone the color bit position is redesignated as an end-of-zone or retrace bit position. When a binary digit of one binary value, e.g., a binary "1" is stored in this position, it signifies that the combination is the last one in the zone and the scanning beam creating the pattern is retraced after creating this segment.

A typical zone may be represented by the following code:

DDD0 $DDC_2C_1$ DDD0 DDD0 $DDC_2C_1$ DDD0 $DDC_2C_1$ wherein $C_1$ is the delimiter bit, $C_2$ is the color designator in the first combination of a zone and is a retrace bit in the last combination of a zone, and D is a data bit.

In FIG. 3 there is shown a table depicting the actual codes that define the zonal segments of the pattern 40 of FIG. 2. It is assumed that the entire length of one vertical scan is 1,024 timing elements which may be represented by 11 data bit positions, i.e., $2^0$ through $2^{10}$. Thus the black zonal segment 46 of the first scan (SC1) which is 896 elements long is representable as:

0 1 1 0 1 0 0 0 0 0 0 0 0 0 1 1, which corresponds to the following coding:

D D D 0 D D D 0 D D D 0 D D $C_2C_1$, which in turn corresponds to the positional notation:

$2^{10}2^{9}2^{8}0$ $2^{7}2^{6}2^{5}0$ $2^{4}2^{3}2^{2}0$ $2^{1}2^{0}C_2C_1$.

It is to be noted that the coding scheme permits a pattern to be reproduced without storing a white border because the initial segment reproduced in a scanline can be black. Scanning of a pattern can also begin on black. The white margin above the pattern 40 is replaced by a dummy white segment of zero length os shown in Column 4 of FIG. 3 for the scanlines SC2–SC5. It is apparent that these dummy white end segments could be detected and utilized to change the $C_2$ bit position in the black segments immediately preceding the dummy white segments into a binary "1." This would cause the reproducing beam to retrace immediately after the last black in the pattern 40. Of course, then the dummy white segmental numbers would not be stored in the memory 98 since they would no longer be needed. This would result in a further compaction of data.

DETAILED DESCRIPTION

Figure 4B:
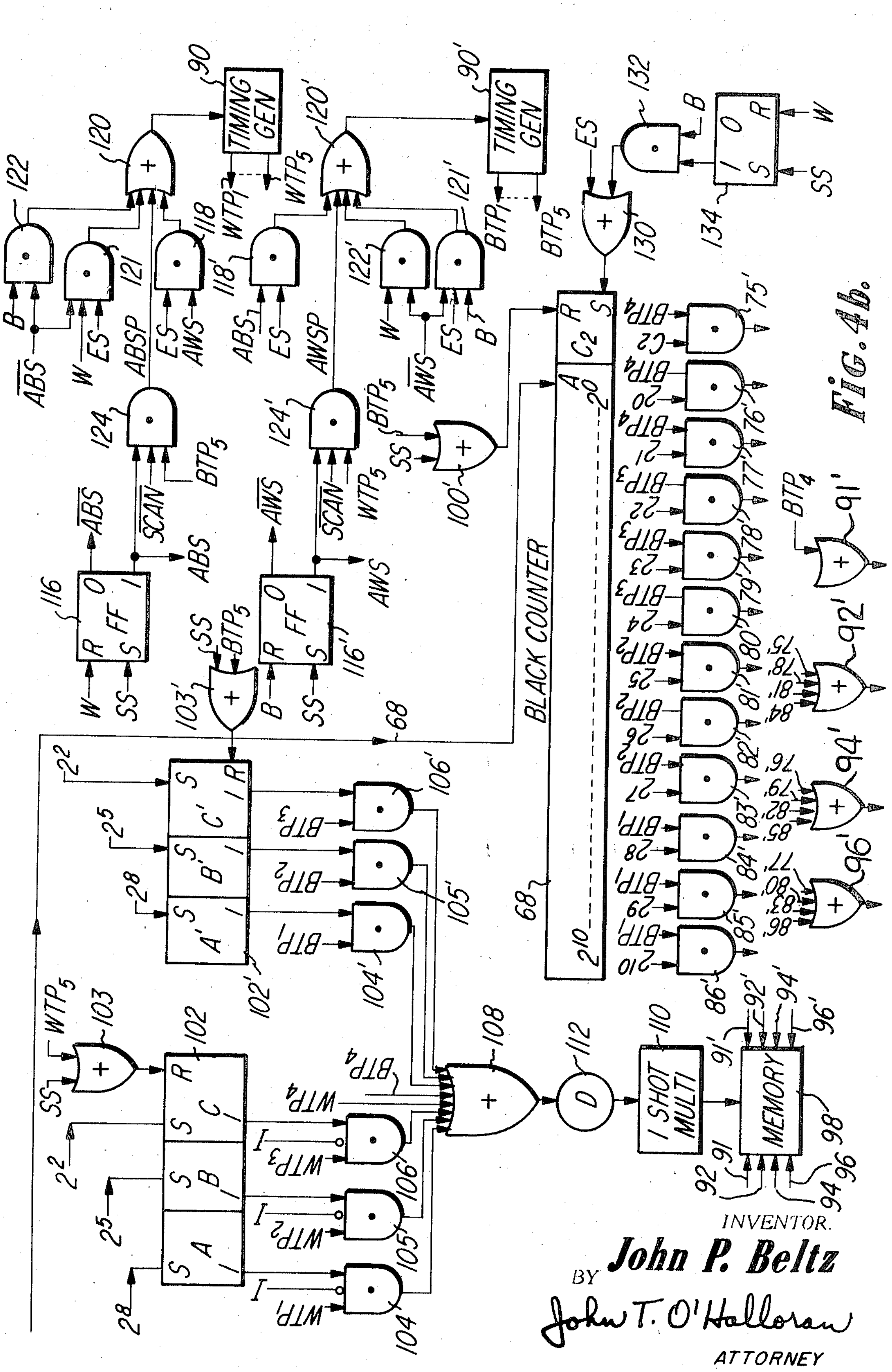

In FIG. 4 there is shown a logic block diagram of the portion of the electronic controller and processor 22 that compactly encodes a signal derived from scanning a pattern, such as the pattern 40 in FIG. 2. The pattern 40 may be located on an opaque background and reflective pattern image signals are derived therefrom. Alternatively the pattern 40 may be located on a transparent background and transmitted pattern image signals are derived therefrom. The signals derived from scanning the pattern 40 are applied to an input terminal 60. The signals derived from scanning the outline trace of the pattern 40 are outline trace image signals or black signals. The signals derived from scanning the background of the pattern 40 are background signals or white signals. In this description, it is assumed that the image signals applied to the terminal 60 are high level video signals when they are black (B) signals and low level video signals when they are white (W) signals. It is also assumed that the term "binary signal" is equivalent to the term "binary bit" and the two terms are used interchangeably.

The black video signals are coupled to an AND-gate 62 along with clock pulses derived from a clock oscillator 64. The clock oscillator 64 is initiated to produce a series of clock pulses during the time that the pattern 40 is being actively scanned, by a SCAN signal derived from a flip-flop 66. The flip-flop 66 is set and reset respectively by a start scan (SS) pulse and an end scan (ES) pulse applied at the beginning and end of a scan to the set (S) and reset (R) terminals thereof. When set, the flip-flop 66 produces the SCAN signal from its (1) output terminal and when reset a $\overline{\text{SCAN}}$ (NOT SCAN) from the (0) output terminal thereof. Thus the clock oscillator 64 produces output pulses only during the active portion of the scan and not during the retrace portion.

The AND-gate 62 is activated whenever a black level signal coincides with a clock pulse and the output pulses produced are applied to the advance terminal (A) of a binary counter 68. The oscillator 64 and black counter 68 effectively digitize the outline trace image signals and transform the length of time that the outline trace of the pattern 40 is being scanned in each scanline into elemental time periods or pulses which are counted by the black counter 68. The black counter 68 includes a plurality of binary counting stages ($2^0$–$2^{10}$) as well as one binary stage $C_2$ which stores the color designator bit, or the end zone retrace bit, or both at different times. The $C_2$ and binary counting stages may consist of flip-flops which, when set, store a binary "1" therein and when reset store a binary "0" therein.

The background or white video signals applied to the input terminal 60 are low level video signals and are inverted by an inverter 70 into high level video signals before application to an AND-gate 72. There are also applied to the AND-gate 72 the timing pulses derived from the clock oscillator 64. The AND-gate 72 is therefore activated by the coincidence of inverted white level video signals and clock pulses and produces output pulses that are applied to the advance terminal (A) of a binary counter 74 identical to the black counter 68. The white counter 74 and oscillator 64 convert the portions of the scanlines that scan the white background of the pattern 40 into a binary count. The white counter 74 also includes a plurality of binary counting stages (referenced $2^0$–$2^{10}$) and a $C_2$ stage.

Both the white counter 74 and the black counter 68 count in the same manner and are substantially symmetrical in output circuits. Accordingly, only the output circuits of the white counter 74 are described in detail. Corresponding components or circuits coupled to the black counter 68 are given the same but primed reference numerals as those coupled to the white counter 74 but are not described.

The $C_2$ stage as well as the $2^0$–$2^{10}$ stages of the white counter 74 are coupled respectively to AND-gates 75 through 86. The AND-gates 75 through 86 are assembled into sets of threes so as to correspond to the three most significant bit positions in each group of the combinations defining the zonal segments. Timing pulses derived from a white timing generator 90 accomplish this assembling into sets. The generator 90 produces a set of successively occurring pulses $WTP_1$–$WTP_5$. The white timing pulse $WTP_1$ is applied to gates 84, 85 and 86 whereas the timing pulse $WTP_2$ is applied to gates 81, 82 and 83. Similarly, the timing pulse $WTP_3$ is applied to gates 78, 79 and 80, and the timing pulse $WTP_4$ is applied to gates 75, 76 and 77. The outputs of the first gate in each of the sets, namely 75, 78, 81 and 84 are applied to an OR-gate 92. The outputs of the second gate in each of the sets, namely 76, 79, 82 and 85, are applied to an OR-gate 94, and the outputs of the third gate in each of the sets, namely 77, 80, 83 and 86, are applied to OR-gate 96. The timing pulse $WTP_4$ is applied to an OR gate 91 to provide the $C_1$ or delimiter bit position in the combination. Of course, the OR-gate 91 is not necessary since there is only one input to this gate, but for symmetry it is included in FIG. 2. The OR-gates 91, 92, 94 and 96 are coupled to a memory 98 which stores the data entered thereinto by these gates. It is to be noted that the $C_2$ stage of the counter is coupled to the OR-gate 92 along with the gates 78, 81 and 84. This shows that this bit position is a data bit position in groups other than the first group i.e., least significant group, of the combination.

The white counter 74 is reset at the start of a scan by a start scan (SS) pulse applied through an OR-gate 100 to the reset terminal (R) thereof. The counter is also reset after transfer of the data stored therein into the memory 98 by a white timing pulse $WTP_5$ applied through the OR-gate 100 to the reset (R) terminal thereof. The "1" output terminal of the $2^2$, the $2^5$ and the $2^8$ stages of the white counter 74 are coupled to the set input terminals of a three-stage white register 102. The register 102 is reset by either a start scan (SS) pulse or a white timing pulse $WTP_5$ applied through an OR-gate 103 to the reset terminal thereof. The "1" output terminals of the three stages A, B, C of register 102 are coupled respectively to AND-gates 104, 105 and 106. The other inputs to the gates 104, 105 and 106 are the white timing pulses $WTP_1$, $WTP_2$ and $WTP_3$ respectively. The output of the gates 104, 105 and 106 along with the white timing pulse $WTP_4$, as well as the outputs of the gates 104', 105' and 106' along with the black timing pulse $BTP_4$ are applied through an OR-gate 108 to activate a one shot multivibrator 110 after a delay in a delay line 112. The one shot multivibrator 110 causes the transfer of the data from the counters 68 and 74 into the memory 98.

Unlike the black counter 68, some of the binary numbers stored in the white counter 74 are not transferred into the memory 98. This is because it is not desirable to store the white background of a pattern that is above the outline trace of a pattern. Hence output AND-gates 76–86 of the white counter stages $2^0$–$2^{10}$ and the output AND-gates 104–106 of the register 102 are all inhibited by an inhibit signal (I) derived from the "1" output terminal of a flip-flop 114.

The flip-flop 114 is set by a white pulse (W) derived from the AND-gate 72 and reset by a black pulse derived from the AND-gate 62. When the flip-flop 114 is set by a white pulse, the white counter 74 counts the scan in the white background of the pattern 40. However this background data will not be transferred into the memory 98 unless a transition to the black outline trace of the pattern 40 occurs and resets the flip-flop 114. The corresponding gates 76'–86', and 104'–106' for the black signals do not have similar inhibiting inputs applied thereto because all of the black signals must be stored to recreate the outline trace of the pattern 40.

The white timing generator 90 initiates the transfer of the white background signal data into the memory 98, whereas the black timing generator 90' does the same for the black data signals. At the start of a scan, a start scan pulse is applied to the set terminal (S) of a pair of flip-flops 116 and 116'. When the flip-flops 116 and 116' are set, an all black scan (ABS) signal and an all white scan (AWS) signal are respectively derived from the "1" output terminals thereof. The flip-flop 116 is reset by a white pulse (W) derived from the AND-gate 72 to produce a "not all black scan" signal ($\overline{ABS}$) from the "0" output terminal thereof. Similarly the flip-flop 116' is reset by a black pulse (B) to produce a "not all white scan" ($\overline{AWS}$) from the "0" output terminal thereof. The all white scan (AWS) signal is applied to an AND-gate 118 along with an end of scan pulse (ES) to activate this gate at the end of an all white scan. The gate 118 applies an activating pulse through an OR-gate 120 to activate the timing generator 90. The timing generator 90 is also activated at a transition from white to black denoting that the background of a character has stopped being scanned and the zonal segmental combination number stored in the white counter should be transferred to the memory 98. Accordingly, the "not all black scan" signal ($\overline{ABS}$) is applied from the flip-flop 116 to an AND-gate 122 along with a black pulse (B) from the AND-gate 62. The AND-gate 122, when activated, produces an output pulse that is coupled through the OR-gate 120 to initiate the timing generator 90. The activation of the AND-gate 122 indicates that the initial portion of a scan was white and a transition to black occurred during the scan. The timing generator 90 is also initiated by applying through the OR-gate 120 an all black scan pulse (ABSP) derived from an AND-gate 124. The AND-gate 124 produces the all black scan pulse at the end of an all black scan during the retrace period ($\overline{SCAN}$), when the timing pulse $BTP_5$ has been generated in the timing generator 90'. When a multisegment scan ends on the white background, an AND-gate 121 is activated by the coincidence with a white pulse (W) of an end of scan pulse (ES) and a not all black scan signal ($\overline{ABS}$). The output of the gate 121 is also coupled through OR-gate 120 to activate the generator 90.

The black timing generator 90' is activated under analogous conditions to those for the white timing generator 90. Thus an all white scan pulse (AWSP) is derived from AND-gate 124' during the retrace period ($\overline{SCAN}$) at the end of an all white scan and applied through OR gate 120' to the generator 90'. The AND-gate 118' supplies an activating pulse at the end of an all black scan whereas the AND-gate 122' supplies an activating pulse when a transition from scanning black to white occurs. The AND-gate 121' activates the generator when a multisegment scan ends on a black segment.

The $C_2$ stage of the white counter 74 is set by an all black scan pulse (ABSP) derived from the gate 124 and applied through OR-gate 126. The $C_2$ stage is also set when the AND-gate 128 is activated by an end of scan pulse (ES) and black has occurred in the scan as denoted by a "not all white scan" signal ($\overline{AWS}$). It is to be recalled that the $C_2$ bit position is a color bit position or a retrace bit position in the first and last combinations of a zone, respectively.

The $C_2$ stage of the black counter is set at the end of a scan by applying an end of scan pulse (ES) through an OR-gate 130 thereto. The $C_2$ stage of the black counter 68 is also set when an AND-gate 132 is activated by a black pulse (B). The AND-gate 132 is enabled at the start of a scan by the setting of a flip-flop 134, which flip-flop is reset by scanning white during the same scan.

OPERATION

In describing the operation of the block diagram of FIG. 4 it will be assumed that the pattern 40 shown in FIG. 2 is being scanned into the system 10. At the start of the first scan (SC1), the start scan pulse (SS) sets the flip-flops 66, 116, 116' and 134. The SCAN signal derived from the flip-flop 66 initiates the clock oscillator 64 to produce clock pulses therefrom. The black zonal segment 46 in scan (SC1), produces a high level input to the AND-gate 62 which activates this gate and starts the black counter 68 counting the black pulses derived therefrom. The first black pulse (B) activates The AND-gate 132 to set the $C_2$ stage in the black counter 68. The setting of a binary "1" in the $C_2$ stage at this time denotes that the first zonal segment in SC1 was black. It is assumed that the number of clock pulses between the start scan line 42 and the end scan line 44 is 1,024 and the equivalent length of the black segment 46 is 896 pulses or timing elements. Therefore, at the end of scanning the black segment 46 the stages $2^7$, $2^8$ and $2^9$ of the black counter 68 are set with all the other stages, except $C_2$, being reset. Similarly the stages A', B' and C' of the register 102' are all set.

When the scanning beam intersects the transition between the segment 46 and the white background of the pattern 40, the black signal goes low and the low level white signal is inverted by the inverter 70 to activate the AND-gate 72 to produce white pulses (W) therefrom. The first white pulse (W) sets the flip-flop 114 and resets the flip-flops 116 and 134. The white pulse (W) along with the "not all white scan" signal ($\overline{AWS}$) activates the AND-gate 122' to start the black timing generator 90'. The black timing pulses $BTP_1$–$BTP_5$ are therefore generated. The black timing pulse $BTP_1$ activates the AND-gates 86', 85' and 84' to produce 011 outputs respectively from these gates. Since the timing pulse $BTP_4$ is not present and therefore not applied to the OR-gate 91', the output of the OR-gates 96', 94', 92' and 91' comprise the binary group 0110. The black timing pulse $BTP_1$ also activates the gate 104' since the A' stage of the register 102' is set. The one-shot multivibrator 110, after a delay, shifts this group into the memory 98. Thus, the most significant group in the combination defining the length of the black segment 46 is stored in the memory 98.

The timing pulse $BTP_2$ shifts the data stored in the black counter stages $2^7$, $2^6$ and $2^5$ as well as the zero output of the OR-gate 91' into the memory 98. This second most significant group in the combination defining the segment 46 is 1,000. The third timing pulse $BTP_3$ from the generator 90' shifts the third most significant group into the memory 98. This group comprises the binary number 0000. The timing pulse $BTP_4$ activates the gates 77', 76' and 75' as well as activates the OR-gate 91'. Consequently the least significant group in this combination is transferred into the memory 98 as the binary number 0011. The $C_1$ or delimiter bit position is a binary "1" denoting that this is the beginning of a zonal segment combination. Since a binary "1" was stored in the stage $C_2$ of the counter 68 this signifies that the first segment in the zone SC1 comprised a black segment. The binary number defining the black segment 46 in zone SC1 is shown in Column 1 of the table of FIG. 3. The last timing pulse $BTP_5$ resets the counter 68 and register 102'.

After scanning the segment 46, the scanning beam traverses the white background of the pattern 40 that is outside the bounds of the outline trace of this pattern. The setting of the flip-flop 114 applies an inhibiting signal (I) to the AND-gates 76–86 as well as AND-gates 104–106. The white counter 74 counts the timing pulses that occur while the background of the pattern 40 is being scanned. At the end of the scan, the end of scan pulse (ES) and the not all black scan ($\overline{ABS}$) activates the AND-gate 121 to start the timing generator 90. The timing generator 90 therefore produces white timing pulses $WTP_1$–$WTP_5$. Since no further black occurs in this scan, the flip-flop 114 remains set. Consequently, the count in the white counter 70 for the stages $2^0$–$2^{10}$ is not transferred to the memory 98, which results in a compaction of data that is stored in the memory 98. Thus the background data outside the bounds of the outline trace is suppressed resulting in this data compaction. The white timing pulse $WTP_4$ however does activate the AND-gate 75 which in turn activates OR-gate 92. Similarly this timing pulse also activates the gate 91 and the binary number 0011 is shifted into the memory 98. The binary "1" in the $C_1$ bit position states that a new zonal segment combination has begun and a binary "1" in the $C_2$ bit position signifies that this is the last zonal segment combination of the zone. The scanning beam reproducing the pattern will therefore be retraced by the detection of this bit. Since the first segment 46 was a black segment, this segment is white because the segments alternate in color and consequently the reproduction scanning beam scans the distance specified, but the beam is off. In this instance the two most significant bit positions are 00 so the scanning beam actually doesn't move at all. It is therefore apparent that a system embodying the invention accomplishes data compaction that efficiently utilizes the storage capacity of a memory while still achieving accurate reproduction of the pattern 40.

It is believed that the derivation of the binary combinations defining the segments in the scans SC2–SC5, shown in the table of FIG. 3, is obvious in view of the above explanation. However, the system operation during the scan SC6 will now be described to denote what happens when an all white scan occurs. At the start of the scan, flip-flops 66, 116, 116' and 134 are set. The white scan signal derived from scanning the white background of the pattern is counted and fills up the white counter 74. At the end of the scan, the end of scan pulse (ES) is coupled through OR-gate 130 to set the $C_2$ stage of the black counter 68. The end of scan pulse also activates the AND gate 118 since an all white scan (AWS) occurred. The timing generator 90 is therefore activated. The inhibit signal (I) applied to the gates 76–86 and 104–106 prevents the white counter from coupling the count in the stages $2^0$–$2^{10}$ into the memory 98. Accordingly there is a compaction of data by suppressing this background data. However the timing pulse $WTP_4$ shifts the group 0001 into the memory 98. The $C_1$ bit position is a binary "1" denoting the fact that a new combination has begun whereas the $C_2$ bit position is 0 denoting that the first segment in the zone is white. When the timing pulse $WTP_5$ is generated, it resets the white counter 74 as well as activates the AND-gate 124' producing an all white scan pulse (AWSP). This pulse activates the timing generator 90' to shift the data in the black counter 68 into memory 98. Since no black occurred in this scan, none of the stages $2^0$–$2^{10}$ have been set and accordingly none of the stages in the register 102' are set. The gates 104'–106' are therefore not activated when the timing pulses $BTP_1$–$BTP_3$ are applied respectively thereto. It is therefore apparent that data compaction occurs when the counter 68 does not count high enough to set the stages in the register 102'.

The timing pulse $BTP_4$ activates the gates 77', 76' and 75' as well as the OR-gate 91' and transfers the binary number 0011 into the memory 98. The number signifies that it is a black scan of zero length and it is the last segment in the zone. Since the length of the segment is zero, the reproduction scanning beam does not trace out a black scanline but is immediately retraced. It is apparent that the two binary groups needed to define an all white scan could be eliminated completely and replaced by a count to cause the interpattern space to be skipped in the reproduction of the pattern.

Thus, in accordance with the invention, there is described both apparatus as well as a method of compacting data needed to define or represent a pattern having an outline trace of one visual reflectance state and a background of a different visual reflectance state. The method includes overscanning a pattern by a plurality of successive scanlines to derive outline trace image signals and background signals to divide the pattern into a plurality of zones including one or more zonal segments corresponding to the outline trace and the background. The method also includes the steps of digitizing the outline trace image signals and the background signals to provide a plurality of outline trace pulses and background pulses and alternately counting by groups the outline trace pulses and the background pulses to provide combinations of groups of numbers defining the outline trace zonal segments and the background zonal segments, with the number of groups in each of the combinations depending on the length of its corresponding zonal segment. The method further includes the step of suppressing combinations defining background zonal segments that occur above the bounds of the outline trace of the pattern so as to compact the data representing the pattern.

What is claimed is:

1. In a system providing a coded representation of a pattern, which pattern is divisible into a plurality of substantially linear adjacent zones each including one or more zonal segments, with successive ones of said segments in a zone alternating in exhibiting different visual reflectance states, the combination comprising:

means for scanning said pattern by a plurality of substantially linear adjacent scanlines, each corresponding to a different one of said zones, to produce signals denoting the content of said pattern;

logic means responsive to said signals for generating a plurality of combinations of groups of coded signals for defining said pattern, with each single combination representing a single zonal segment;

each of said groups including a predetermined number of individual binary signals with the number of groups in each combination selected to correspond to the length of its associated zonal segment; and logic means responsive to said signals for generating a delimiter binary signal of one value at a predetermined position in the first group of a combination with the same predetermined position in every remaining group of said combination selected to exhibit a binary signal of a second value whereby one combination is distinguished from the next successive combination to separate successive segments in a zone.

2. The combination in accordance with claim 1 that further includes:

means for selecting as a color designator a second predetermined position in the first group of a combination representing the first segment in a zone to denote that said first segment exhibits one visual reflectance state when a binary signal of one value is recorded in said second predetermined position and exhibits another visual reflectance state when a binary signal of the other value is recorded therein.

3. The combination in accordance with claim 2 that further includes:

means for redesignating said second predetermined position in said first group of the combination representing the last segment in a zone as a zonal end position to denote the last segment in a zone when a binary signal of one value is recorded therein so that one zone can be distinguished from another when the number of zonal segments vary from zone to zone.

4. The combination in accordance with claim 3 that further includes:

means for utilizing said second predetermined position as a data position to record therein a data signal in groups other than the first group in said combinations.

5. In a system for providing a coded representation of a pattern having an outline trace of one visual reflectance state and a background of a different visual reflectance state, the combination comprising:

means for overscanning said pattern by a plurality of successive scanlines which divide said pattern into a plurality of zones, each zone of said pattern having one or more zonal segments corresponding to said outline trace and said background;

means responsive to said overscanning for producing outline trace image signals and background signals for the several zones;

means for digitizing said outline trace image signals and said background signals to provide a plurality of outline trace pulses and background pulses;

means for alternately counting by groups said outline trace pulses and said background pulses to provide combinations of groups of numbers defining said outline trace zonal segments and said background zonal segments, with the number of groups in each of said combinations depending on the length of its corresponding zonal segment; and means for suppressing combinations defining background zonal segments that occur outside of the bounds of the outline trace of said pattern so as to compact the data representing said pattern.

6. The combination in accordance with claim 5 wherein said means for counting include a pair of binary counters for counting said outline trace pulses and said background pulses.

7. The combination in accordance with claim 6 wherein each one of said groups includes a predetermined number of binary signals.

8. The combination in accordance with claim 7 that further includes;

means for providing a delimiting binary signal of one value in a predetermined position in the first group in each combination and a binary signal of a second value in the same predetermined position of every other group in said combination to distinguish between successive combinations to separate different zonal segments in a zone.

9. The combination in accordance with claim 8 that further includes:

means for providing a color designator binary signal in a second predetermined position in said first group of the first combination in a zone to denote a zonal segment of one visual reflectance state when a binary signal of one value is recorded therein and a zonal segment of the other reflectance state when a binary signal of another value is recorded therein.

10. The combination in accordance with claim 9 that further includes:

means for providing a zone end determining signal in said second predetermined position in combinations other than the first combination of a zone to denote the last zonal segment in a zone when a binary signal of one value is recorded therein.

11. The method of providing a coded representation of a pattern having an outline trace of one visual reflectance state and a background of a different visual reflectance state, comprising the steps of:

overscanning said pattern by a plurality of successive scanlines to derive outline trace image signals and background signals, said scanlines dividing said pattern into a plurality of zones each including one or more zonal segments corresponding to said outline trace and said background;

digitizing said outline trace image signals and said background signals to provide a plurality of outline trace pulses and background pulses;

alternately counting by groups said outline trace pulses and said background pulses to provide combinations of equal length groups of numbers defining said outline trace zonal segments and said background zonal segments, with the number of groups in each of said combinations depending on the length of its corresponding zonal segment; and suppressing combinations defining background zonal segments that occur outside of the bounds of the outline trace of said pattern so as to compact the data representing said pattern.

12. In a system for presenting to a display means a pattern that is divisible into a plurality of substantially linear adjacent zones each of which includes one or more zonal segments, with successive ones of said segments in a zone exhibiting different visual reflectance properties, the combination comprising: a display means for scanning in a sequential zonal manner; storage means storing a coded representation of a pattern as a plurality of combinations of groups of coded bits, each of said combinations corresponding to a separate zonal segment and each of said groups containing a like number of individual binary bits, the number of groups in a combination varying as a function of the length of its corresponding zonal segment; and means for reading out the contents of said storage means to said display means selectively.

13. The combination as claimed in claim 12 wherein the storage means stores a framing binary bit of one value at a first predetermined position in the first group of a combination and a binary bit of second value at the corresponding predetermined position in every remaining group of the same said combination, whereby any combination is distinguishable from the next successive combination for the same zone.

14. The combination as claimed in claim 13, wherein said storage means stores an end of zone bit of one binary value at a second predetermined position in the first group of the last combination of a zone so that the stored information for one zone is distinguishable from that of the next zone when the combinations of groups of coded bits therefor are in sequence.

* * * * *